(12) United States Patent
Sorensen (10) Patent No.: US 11,035,662 B2
(45) Date of Patent: Jun. 15, 2021

(54) DYNAMIC PALLET DIMENSIONING WITH FORKLIFT TARING

(71) Applicant: Mettler-Toledo GmbH, Greifensee (CH)

(72) Inventor: Einar Sorensen, Oslo (NO)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 16/422,113

(22) Filed: May 24, 2019

(65) Prior Publication Data

US 2019/0361125 A1 Nov. 28, 2019

(30) Foreign Application Priority Data

May 25, 2018 (EP) .................................. 18174220

(51) Int. Cl.
| | | |
|---|---|---|
| *G01B 11/00* | (2006.01) | |
| *B66F 9/075* | (2006.01) | |
| *G01B 11/04* | (2006.01) | |
| *G01G 19/08* | (2006.01) | |
| *G01S 7/481* | (2006.01) | |
| *G01S 7/4915* | (2020.01) | |
| *G01S 17/58* | (2006.01) | |
| *G01S 17/87* | (2020.01) | |
| *G06Q 50/28* | (2012.01) | |

(52) U.S. Cl.
CPC ............ *G01B 11/00* (2013.01); *B66F 9/0755* (2013.01); *B66F 9/07504* (2013.01); *G01B 11/04* (2013.01); *G01G 19/083* (2013.01); *G01S 7/4817* (2013.01); *G01S 7/4915* (2013.01); *G01S 17/58* (2013.01); *G01S 17/87* (2013.01); *G06Q 50/28* (2013.01)

(58) Field of Classification Search
CPC ...... B66F 9/07504; B66F 9/0755; B66F 9/24; G01B 11/00; G01B 11/04; G01G 19/083; G01S 17/58; G01S 17/87; G01S 17/89; G01S 7/4817; G01S 7/4915; G06Q 50/28
USPC .................................................. 356/614–640
See application file for complete search history.

(56) References Cited

U.S. PATENT DOCUMENTS

| 2017/0227674 A1 | 8/2017 | Sorensen et al. |
| 2017/0228885 A1 | 8/2017 | Baumgartner |
| 2018/0053305 A1 | 2/2018 | Gu et al. |

FOREIGN PATENT DOCUMENTS

| EP | 2439487 A1 | 4/2012 |
| WO | 2017/042747 A2 | 3/2017 |

*Primary Examiner* — Tri T Ton
(74) *Attorney, Agent, or Firm* — Standley Law Group LLP; Jeffrey S. Standley; Stephen L. Grant (57) ABSTRACT

Cargo objects, in a freight-related environment, are dynamically dimensioned while being held at a cargo-handling position of a vehicle. A three-dimensional model is obtained comprising points representing surfaces of the vehicle. Using the model, the position of a point of reference of a first wheel of the vehicle is obtained, as is the position of a split point relative to the position of the first wheel point of reference. A driving direction of the vehicle is obtained. A splitting plane is determined, which passes through the split point and is perpendicular to the driving direction. A three-dimensional model of the cargo is determined by subtracting, from the vehicle three-dimensional model, the points that are positioned on the side of the splitting plane opposite to the side of the splitting plane that make up the first wheel point of reference. The volume is then determined from the cargo three-dimensional model.

14 Claims, 7 Drawing Sheets

DYNAMIC PALLET DIMENSIONING WITH FORKLIFT TARING

CROSS-REFERENCE TO RELATED APPLICATIONS

This application makes a claim of priority to European Patent Application 18174220.6, filed on 25 May 2018, which is incorporated by reference as if fully recited herein.

TECHNICAL FIELD

The invention relates to a method and a system for dynamically dimensioning cargo objects, such as packages, crates and pallets, while being transported on a vehicle, in a freight or less-than-truckload cross docking environment. The term "dimensioning" in the present context refers to the process of determining the volume that a cargo object occupies in order for example to assess shipping and storage charges. A dimensioning system is an apparatus that performs this dimensioning process automatically.

BACKGROUND ART

The concept of dimensioning systems arises from the thought that shipping charges should not be determined solely based on the weight of an object, but also based on its dimensions, to account for the amount of space taken up in a warehouse or on a transport carrier such as an airplane, a ship, a railway car or a truck. In practice this means that, in addition to being weighed on a scale, cargo objects are also measured, either manually or with an automated dimensioning apparatus, to determine their so-called dimensional weight, also known as volumetric weight or cube weight, which is based on the length l, width w and height h of a shipping object and a density factor D set by the shipping company. When accepting an object for shipment, its dimensional weight $W_{dim}=l \times w \times h \times D$ and its actual weight (determined by weighing the object on a scale) are compared to each other and the price of shipping is based on the larger of the two weight values. The rationale for this is that lightweight goods occupying a large volume should be priced according to the amount of space taken up rather than based on weight in order to promote compact packaging of goods and efficient use of available cargo space on carrier vehicles and in storage facilities.

On their way from the sender to the recipient, the objects often pass through several distribution hubs where they are transferred from one carrier vehicle to another, which can involve different modes of transportation including airplanes, ships, railways, trucks, conveyors and forklift vehicles. At each transfer, the dimensions of the objects, and often their weights, are determined, in order to make optimum use of the available cargo space while avoiding the risk of overloading.

The dimensional weight of an object can be determined by manually taking measurements and entering the data into a computer system, which is the procedure commonly used at the retail locations of postal service organizations and parcel-shipping companies. However, in large-scale facilities where many shipments are processed at a fast pace and out of sight of the customer, such manual methods are error-prone and can result in either overcharging or undercharging a customer. In response to this problem, various methods and solutions have been developed to determine the dimensional weight of objects in distribution facilities and warehouses, including laser-ranging and laser-scanning systems.

State-of-the-art dimensioning systems, adapted to measure dynamically dimensional weight of objects while being transported on a moving vehicle, for which European published application 3203264 A1 (corresponding to US published application 2017/227674 A1) may be cited as an example, generally contain a plurality of scanners, each of which has a laser light source, a deflector device and a light receiver arranged inside one compact scanner unit. A modulated laser beam emitted by the light source is swept by the deflector unit in a fan-like manner over the object, so that the point of incidence of the laser beam moves over the surface of the object along a scan line. Reflected light returning from the object is optically focused onto the light sensor. At discrete points in time, based on the time delay or phase shift between the emitted light and the received light, the distance travelled by the light is calculated. The travel distance together with the known spatial direction of the laser beam at that same point in time allows the position of the point of incidence on the object surface to be determined in spatial coordinates. The totality of surface points determined in this manner by the one or more scanners of a dimensioning system can be assembled in a so-called point cloud which represents a three-dimensional virtual model of the object surface. From this three-dimensional model, the length l, width w and height h, and thus the dimensional weight D, can be determined for any object regardless of its shape and its orientation relative to the scanners. In addition to determining the phase shift or time delay of the light returning from the target object and calculating the surface contours of the objects under investigation, laser range finders, including those used in dimensional weight systems, also measure the intensity of the returning light. The intensity data may also be used to tint the surface of the three-dimensional virtual model in monochromatic tones corresponding to the intensity levels. Based on the three-dimensional surface-tinted model, grayscale images of the object from any viewing angle exposed to the scanner rays can then be synthesized on demand.

In a typical configuration, the state-of-the-art dimensioning systems are arranged in a warehouse along a path passed by a forklift truck. Scanners are mounted in different positions along the path of the forklift truck: on opposite sides of the path, suspended from the warehouse ceiling, for obtaining the speed and direction of the forklift truck, and on one side of the path close to the warehouse floor, for measuring the height of the pallet and cargo carried by the forklift truck. The information collected by the dimensioning system serves to establish the three-dimensional model data for the truck and cargo. Using state-of-the-art image-processing techniques, the forklift truck as well as any of the warehouse surroundings recorded by the scanners can be removed from the three-dimensional model. Two-dimensional images from different viewing angles are then produced and used to compute the dimensional weight of the cargo.

In the aforementioned state-of-the-art dimensioning systems, one key aspect for determining accurately the dimensional weight of the cargo is to achieve an effective separation—a process called taring—, between areas corresponding to the forklift truck and areas corresponding to the cargo.

One solution consists in putting markers or reflectors on the forklift truck and/or on the pallet, according to a known arrangement, for example on the tower of the truck at specific points. Objects of the three-dimensional model corresponding to the truck, identified thanks to the position of the markers, are then removed. At the end of this process, the three-dimensional model relates only to the cargo. However, an installation phase is required to equip each forklift truck with the necessary identification marks. That is why this solution is not practical for large facilities where fleets may comprise hundreds of different trucks, with vehicles being replaced regularly.

Another known solution, described for example in patent document US 2018/0053305 A1, is based on color analysis of captured images of the forklift truck and the pallet. For instance, pixels of the captured images having a color comprised within the range of colors associated to the forklift truck, are removed. However, this solution is not reliable if cargo presents surfaces which colors are too similar to those of the forklift truck, which is in actual conditions quite limiting. Moreover, it also requires the use of scanning arrangements that are capable of discerning colors with a good level of consistency and precision: since the relative position of the truck to the scanning arrangement is not fixed, and lighting conditions may vary greatly, several adverse optical phenomena such as specular reflection or cross-color contamination may occur, in an actual typical freight environment.

It is therefore still desirable to provide means for reliably dimensioning a cargo, while being transported on a vehicle, adapted to be deployed efficiently in a freight or less-than-truckload cross docking environment, without requiring modification of said vehicles, or based on any assumption on the color or form of the cargo.

SUMMARY

This objective is met by the method set forth in the independent and dependent claims. A dimensioning system designed to carry out the method is also claimed, as is a software program through which the method can be executed by a computerized system. A support for storing a computer program through which the method can be executed by a computerized system is also claimed.

To that end, according to a first aspect, the present invention concerns a method of dimensioning a cargo while being held at a cargo-handling position of a vehicle. The cargo comprises, for example, one or a plurality of packages or crates. During transportation, the cargo is typically held by a pallet lift by a loading arrangement positioned at the cargo-handling position of the vehicle.

In a typical configuration, the vehicle may be a forklift truck. The loading arrangement may comprise forks—also designated by the terms blades or tines—coupled to a tower—also designated by the term "mast"—, so as that an operator may control vertical movements of the pallet and the cargo. The loading arrangement may also allow the operator to tilt the tower to orient the pallet relatively to the ground. Tilting the cargo relatively to the ground is in particular appropriate to compensate for a cargo's tendency to angle the blades toward the ground and/or to allow operating the vehicle on non-level ground.

The term "dimensioning" in the present context refers to the process of determining the volume that the cargo occupies, in order for example to assess shipping and storage charges. The method according to the invention may be carried out while the vehicle is moving, typically, in a freight or less-than-truckload cross docking environment.

The method comprises the following steps:
obtaining a three-dimensional model data comprising a set of points representing surfaces of the vehicle transporting the cargo;
determining, using the three-dimensional model data, the position of a point of reference of a first wheel of the vehicle;
obtaining the position of a split point relatively to the position of the point of reference of the first wheel;
determining a driving direction of the vehicle; and
determining the splitting plane passing through the split point and perpendicular to the driving direction, and determining a three-dimensional model data of the cargo by subtracting, from the three-dimensional model data of the vehicle transporting the cargo, the points, amongst the set of points, positioned on the side of the splitting plane opposite to the side of the splitting plane comprising the point of reference of the first wheel; determining the volume of the three-dimensional model data of the cargo.

The three-dimensional model data representing the surfaces of the vehicle transporting the cargo is for example a data structure, stored in a computer memory, comprising the set of points—also designated by the term "point cloud" or "pixel cloud"—, each point being described in a three-dimensional space with a coordinate triplet (x,y,z). Each point of the three-dimensional model data may also be associated with a measurement value. The measurement value may in particular relate to an intensity value, for instance a measurement value of the tint of the surface of the vehicle in monochromatic tones corresponding to the intensity levels.

The three-dimensional model data may be obtained from a three-dimensional scanner, for example a scanner as described in the published patent application EP 3203264 A1.

Consequently, the three-dimensional model is a representation of the surfaces of the vehicle, as seen by the measuring device having provided the three-dimensional model data. Geometric transformations in three-dimensional space, such as translation and rotation, can be applied to the three-dimensional model, in the computer memory, using conventional linear algebra.

The point of reference relates to a specific point of the first wheel that can be identified using the three-dimensional model data.

The driving direction can be expressed by a vector in a three-dimensional space, oriented in the direction of the vehicle's heading, while the cargo being dimensioned using the method according to the invention.

In the typical configuration where the vehicle is a forklift truck, the split point is located at a point of contact between the pallet and the tower, while the pallet is sensibly levelled relatively to the ground. The split point is located where the pallet would touch the tower, when the pallet is fully engaged on the fork and thus can not any longer be moved closer to the tower.

With the forklift truck moving according to the driving direction, the tower being vertically oriented relatively to the ground and the pallet being levelled, the splitting plane can then be defined as the plane passing through the split point and orthogonal to the driving direction. In this configuration, the splitting plane is placed at the front in the driving direction of the tower.

Since the first wheel is positioned on the side of the splitting plane opposite to the side of the cargo, and since the spatial relationship—notably the distance—between the split point and the point of reference of the first wheel is sensibly constant, subtracting, from the three-dimensional model data of the cargo, points positioned on the side of the splitting plane opposite to the side of the splitting plane comprising the point of reference of the first wheel allows one to obtain a three dimensional model comprising only points related to the pallet and the cargo.

By using a point of reference on the wheel to identify which parts of the three-dimensional model data belongs to the cargo, the method doesn't require any substantial modification of the vehicle, such as the sticking of markers. Moreover, no assumption is made on colors and forms of the cargo: thus, the method is working whatever colors the trucks or the cargo might be, and are also consequently more robust. In particular, identify the point of reference on the wheel is highly reliable, since robust and proven algorithms to recognize such kinds of shapes are available. The method can then be deployed easily in large facilities where fleets may comprise hundreds of different trucks, of different models, shapes and colors.

The point of reference of the first wheel may be determined by identifying a point of contact of the vehicle to the ground. This solution is particularly reliable since a point of contact to the ground constitutes a particularly easy to identify feature clearly standing out in the three-dimensional model data of the vehicle transporting the cargo.

The point of reference is, for example, the mass or geometric center of the first wheel. Robust segmentation algorithms can then be used to provide an easy and efficient way of identifying a well-defined point in the three-dimensional model data of the vehicle transporting the cargo.

The point of reference may alternatively be a known recognizable pattern on the first wheel, that can be identified using the three-dimensional model data, such as a visible marker or a known geometric part of the first wheel.

The vehicle may comprise at least one second wheel, the first wheel being recognized from the at least one second wheel, in the three-dimensional model data of the vehicle, by identifying a feature specific to the first wheel. By using a feature specific to the first wheel, it is possible to discriminate between the first wheel and the second wheel, without requiring external information about the orientation of the vehicle or the geometry of the vehicle. The feature specific to the first wheel may relate for example to the diameter or radius of the first wheel. Since it is common in forklift trucks to have at least one wheel that has a larger diameter compared to others—typically the front wheel positioned near the tower, using this feature as the specific feature of the first wheel, provides an effective and reliable solution to identify the position of the point of reference, without requiring more complicated features searches. From the knowledge of the position of the front wheel relatively to the rear wheel, the driving direction can also be inferred. Thus, using an external sensor are not required to determine the driving direction of the vehicle.

The position of the split point relatively to the position of the point of reference of the first wheel may be obtained by:
obtaining identity information of the forklift truck or of a type associated to the forklift truck; and
obtaining, according to the identity information, from a memory, relationship information necessary to determine the position of the split point relatively to the position of the point of reference of the first wheel.

Since the relationship information necessary to determine the position of the split point relatively to the position of the point of reference of the first wheel is specific to each model of forklift trucks, storing and retrieving said relationship information allows the method to be applied to various types or models of forklift trucks, without requiring any modification of said trucks. The relationship information may be measured during a setup phase for each truck of the freight or for each similar model of forklift trucks, and used to populate records of the database.

In one embodiment, the vehicle is a forklift truck comprising four wheels. As a consequence, considered from a longitudinal side view of the vehicle, two wheels can be identified in the three-dimensional model data. In this configuration, the first wheel is one of the two wheels. The wheel positioned under the tower of the forklift truck, which may be defined as the front wheel, may be smaller than the other wheel that can be seen in the longitudinal side view of the vehicle. Advantageously, in this latter configuration, the first wheel may be the front wheel positioned under the tower of the forklift, as seen in the longitudinal side view of the vehicle, since it is easy to identify it considering its reduced diameter.

In another embodiment, the vehicle is a forklift truck comprising three wheels, with a rear wheel positioned at a centered position in the back of the vehicle, relatively to the front wheel. Considered from a longitudinal side view of the vehicle, the front wheel can be identified in the three-dimensional model data, and the rear wheel can also be identified, even if it is only partially visible from said longitudinal side view. The wheel positioned under the tower of the forklift truck, which may be defined as the front wheel, may be smaller than the other wheel that can be seen in the longitudinal side view of the vehicle. Advantageously, in this configuration, the first wheel may be the front wheel positioned under the tower of the forklift, as seen in the longitudinal side view, since it is easy to identify it considering its reduced diameter, and its full visibility in the longitudinal side view.

According to a second aspect, the invention also relates to a dimensioning system for carrying out the method according to the first aspect. The dimensioning system is arranged to dimension a cargo while being held at a cargo-handling position of a vehicle. It comprises scanner units arranged to determine a three-dimensional model data comprising a set of points representing surfaces of the vehicle transporting the cargo. The dimensioning system further comprises a processing unit configured to:
determine, using the three-dimensional model data, the position of a point of reference of a wheel of the vehicle;
obtain the position of a split point relatively to the position of the point of reference of the wheel;
determine a driving direction of the vehicle;
determine the splitting plane passing through the split point and perpendicular to the driving direction, and determining a three-dimensional model data of the cargo by subtracting, from the three-dimensional model data of the vehicle transporting the cargo, the points, amongst the set of points, positioned on the side of the splitting plane opposite to the side of the splitting plane comprising the point of reference of the wheel;
determine the volume of the three-dimensional model data of the cargo.

According to a third aspect, the present invention also relates to a computer program that can be downloaded from a communication network and/or stored on a medium. This computer program comprises instructions for causing implementation of the method according to the first aspect, when said program is run by the processor.

According to a fourth aspect, the present invention also relates to information storage means, storing a computer program comprising a set of instructions causing implementation of the method according to the first aspect, when the stored information is read from said information storage means and run by a processor.

BRIEF DESCRIPTION OF DRAWINGS

In the following, the invention will be explained in more detail through examples and references to the attached drawings, wherein.

DESCRIPTION OF EMBODIMENTS

The technology underlying the present invention is described in the published patent application EP 3203264 A1, which is herewith incorporated by reference.

Figure 1:
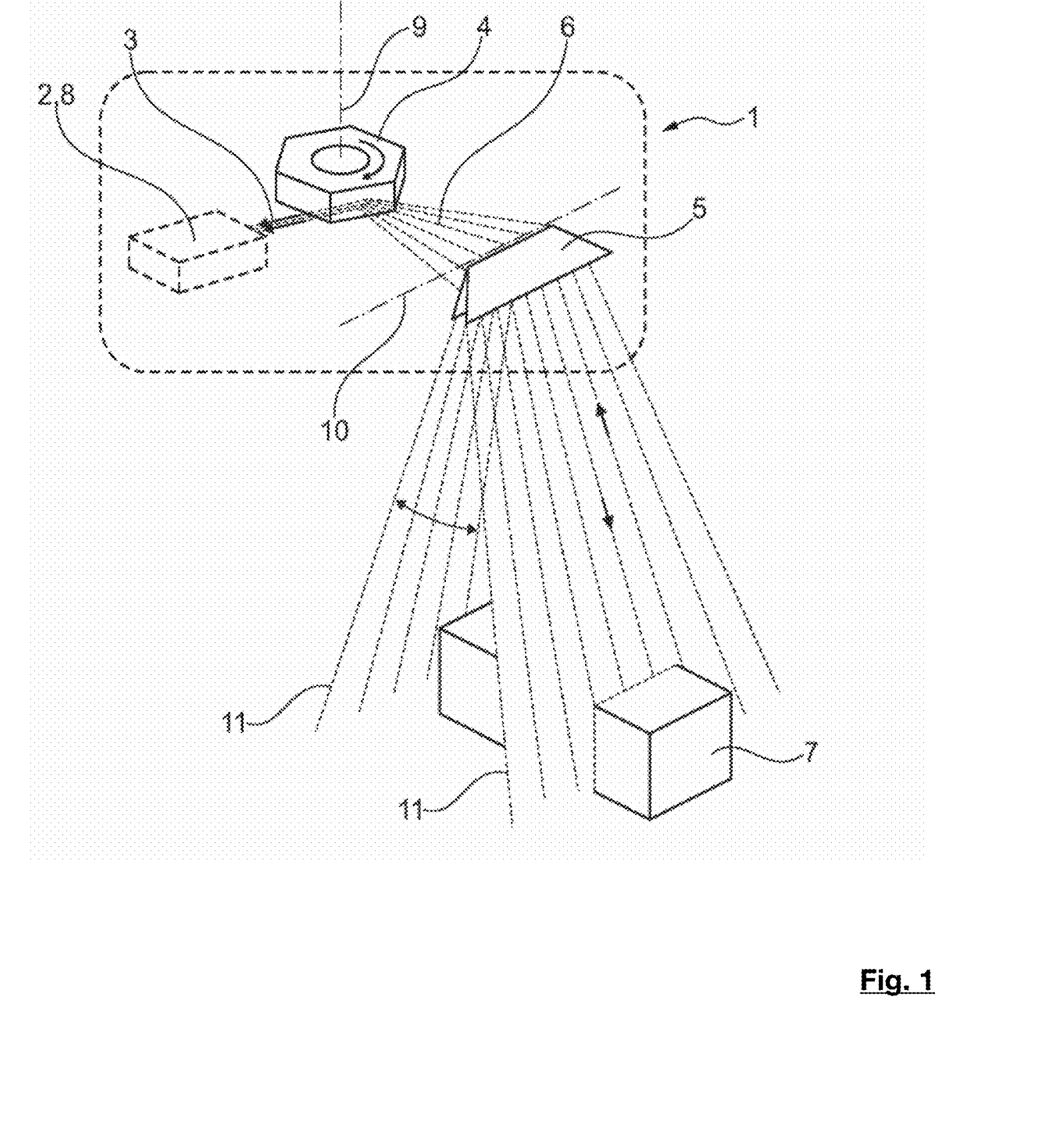
FIG. 1 illustrates an example for the sweep action of one of the laser scanners used to carry out the method.

FIG. 1 schematically illustrates a laser scanner 1 of a type that can be used to carry out the method of the present invention. Its principal components are an emitter 2 of a collimated beam 3 of modulated laser radiation, a dynamic beam deflector 4, 5 to move the collimated beam 3 in fan-shaped sweeps 6 over the object 7 (wherein the latter can be at rest or in motion), and a radiation sensor 8 (arranged here in a combined emitter/receiver unit 2, 8) to receive the radiation reflected from the object 7 and convert it into an electrical signal.

After leaving the emitter 2, the laser beam 3 meets the hexagonal mirror prism 4 which in the arrangement of FIG. 1 rotates about a vertical axis 9 and causes the laser beam 3 to perform continuous fan-like sweeps in a horizontal plane. A second deflector 5, here in the form of a planar mirror 5 swiveling about a horizontal axis 10 deflects the sweeping laser beam 3 into the area of the object 7. As a result of the swivel movement of mirror 5, the reflected sweep 11 of the laser beam 3 likewise swivels back and forth, so that a surface of an object 7 that is exposed to the combined sweep and swivel movement of the laser beam 3 can be captured by the scan. However, it should be noted that the deflector arrangement 4, 5 as well the combined sweep/swivel motion described and illustrated here are intended only as a practical example of a scanner arrangement and are not to be interpreted as limitations of the invention.

Figure 2:
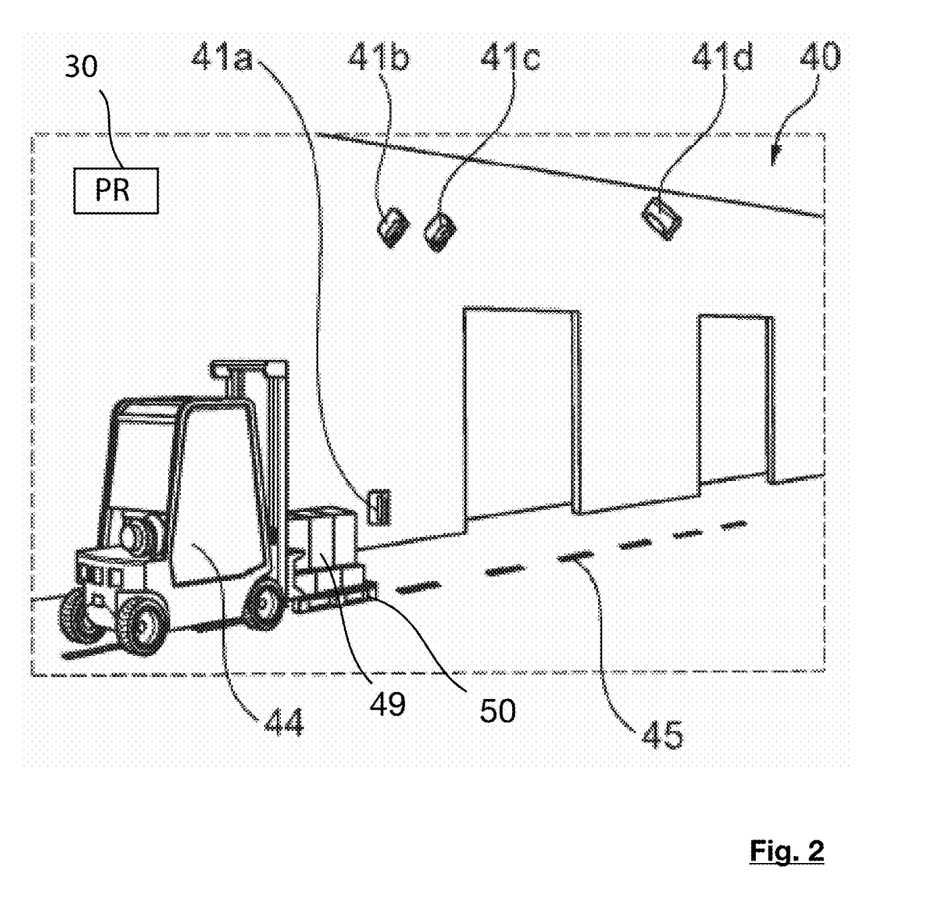
FIG. 2 illustrates a scanner arrangement of a dimensioning system used to scan objects on a forklift truck in motion.

FIG. 2 shows a dimensioning system 40 arranged in a warehouse along a path 45 passed by a forklift truck 44. The dimensioning system 40 further comprises a processing unit 30, typically a computer system or an embedded dedicated hardware platform, adapted to implement the method according to the invention, and in particular to determine the volume of the cargo as explained hereafter.

Typically, when the forklift truck 44 passes through the dimensioning system 40, the cargo 49 is carried above ground on the pallet 50. Four scanners 41a, 41b, 41c, 41d are mounted in different positions along the path 45 of the forklift truck. The scanners 41b and 41 are arranged on opposite sides of the path 45, for example suspended from the warehouse ceiling, and are forming a dual-head arrangement. The scanner 41c in cooperation with the scanner 41b serves to measure the speed and driving direction of the forklift truck 44. The scanner 41a is mounted on one side of the path 45 close to the warehouse floor and serves to measure the height of the pallet and cargo carried by the forklift truck 44. The scan information, including the intensity values, collected by the dimensioning system 40 serves to establish the three-dimensional model data for the truck and cargo. Using state-of-the-art image-processing techniques, any of the warehouse surroundings recorded by the scanners can be removed from the three-dimensional model at any stage before a two-dimensional image is issued.

Figure 3:
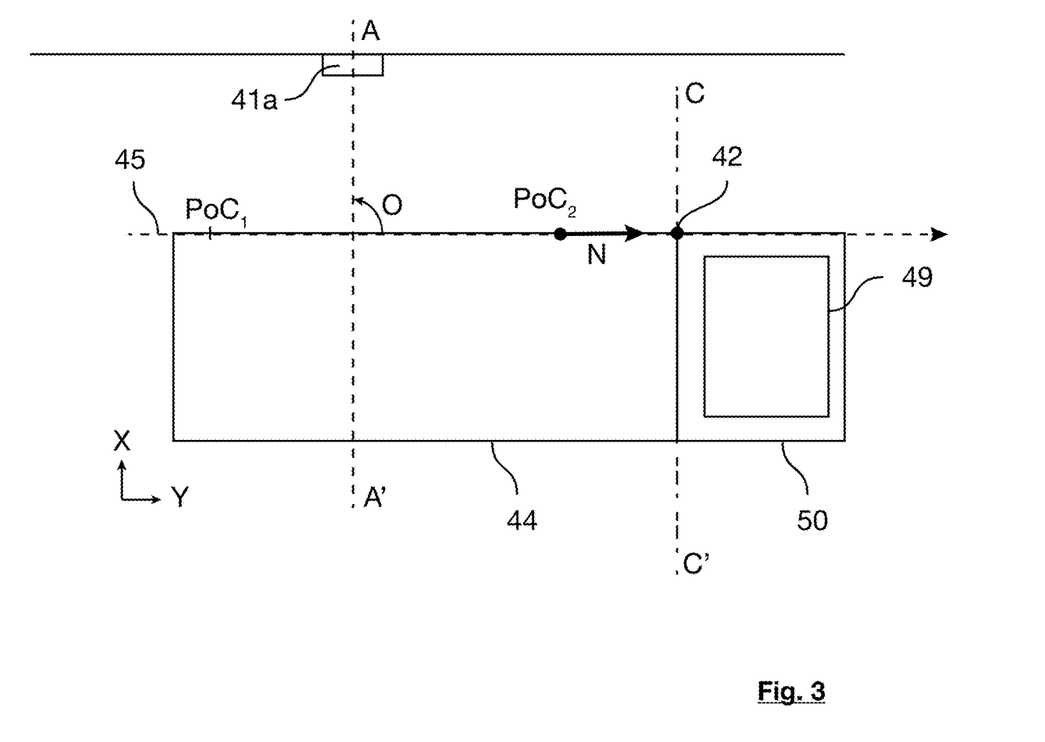
FIG. 3 illustrates, schematically, a forklift truck, from a top view, in a first spatial configuration.

FIG. 3 shows, from a top view XY, a spatial configuration SC1 of the scanner 41b relatively to the path 45 followed by the forklift truck 44 across the dimensioning system 40. A central axis AA' of the scanner 41b is also represented. In the example of the FIG. 3, the central axis AA' is sensibly perpendicular—angle O being equal to 90° on FIG. 3—to the driving direction N of the vehicle on the path 45. A first point of contact $PoC_1$, a second point of contact $PoC_2$, a splitting point 42 and the corresponding splitting plane CC'C" are also represented on FIG. 3 and will be introduced and discussed later in this description.

Figure 4:
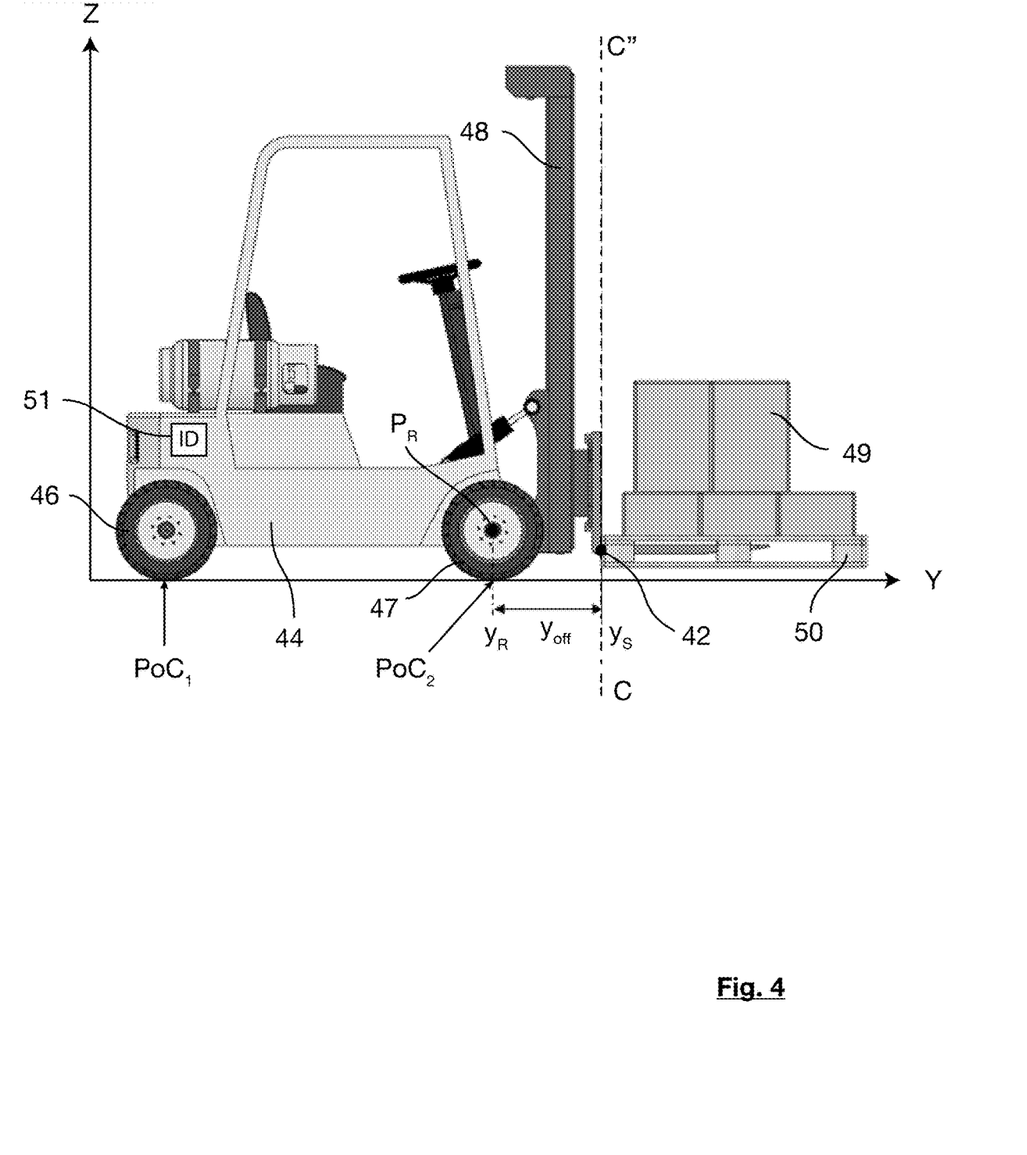
FIG. 4 illustrates the forklift truck, from a side view, in the first spatial configuration.
Figure 5:
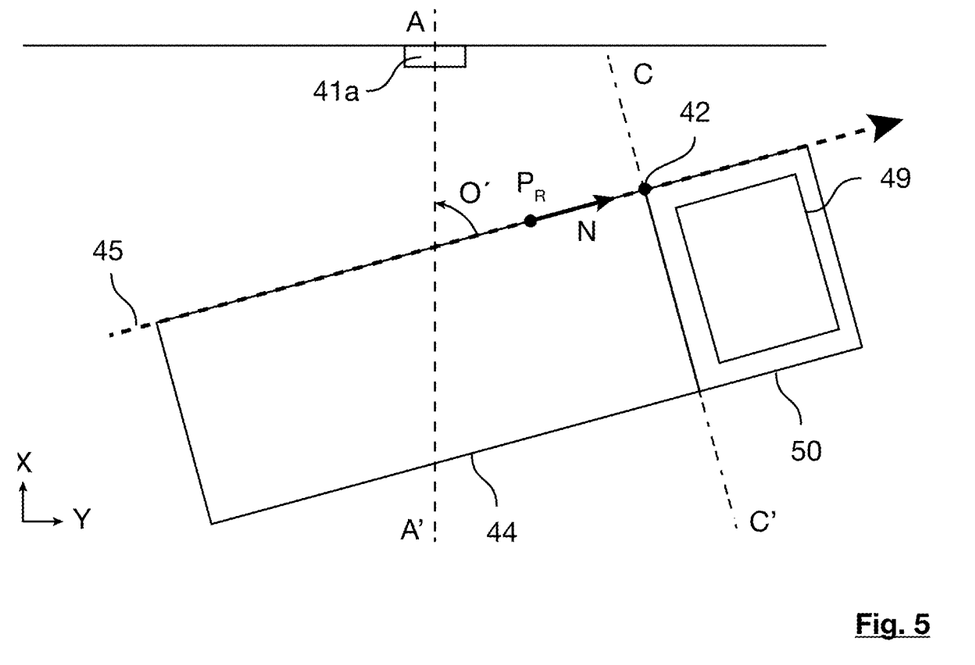
FIG. 5 illustrates, schematically, the forklift truck, from a top view, in a second spatial configuration.

FIG. 4 shows, from a side view YZ, the forklift truck 44, as seen by the scanner 41a positioned according to the spatial configuration SC1 illustrated in FIG. 3. The cargo-handling position of the forklift truck 44 illustrated on the FIGS. 3, 4 and 5, is the front part of the vehicle—represented on the right in the figures—or stated otherwise in front of the driving position of the operator in the driving direction N. The rear wheel 46 of the forklift truck 44 is in contact with the ground at the first point of contact $PoC_1$, the front wheel 47 of the forklift 44—i.e. the nearest wheel to the tower 48 lifting the pallet 50—at the second point of contact $PoC_2$. The points of contact are particularly easy to identify features since they are clearly standing out in the point cloud as seen by the scanner 41b.

The front wheel of the forklift 44 can be distinguished from the rear wheel 46 by identifying geometrical features specific to the front wheel 47. Typically, the diameter of the front wheel is larger than the diameter of the rear wheel 46. From the knowledge of the position of the front wheel relatively to the rear wheel, the driving direction can also be inferred.

Using the three-dimensional model data, the position of a point of reference $P_R$ of one of the wheels is determined. If the front wheel is considered as the reference wheel, the point of reference $P_R$ may be the geometric or mass center of the front wheel. In this case, the position of the center of the front wheel 47 is then determined, using state-of-art segmentation algorithms with the point cloud as seen by the scanner 41b and from the knowledge of the position of the second point of contact $PoC_2$.

The split point 42 is located at a point of contact between the pallet 50 and the fork mounted on the tower 48. The splitting plane CC'C" is the plane passing through the split point 42 and perpendicular to the driving direction N. The splitting plane CC'C" is perpendicular to the ground. The position of the split point 42 relatively to the point of reference $P_R$ is constant for all the vehicle of the same type.

In the example illustrated on FIG. 4, the scanner 41a being positioned according to the spatial configuration SC1, the position of the split point 42 relatively to the position of the center of the front wheel 47 is determined using an offset value $y_{OFF}$. The offset value $y_{OFF}$ corresponds to the distance, on the longitudinal axis Y parallel to the ground, between the coordinate $y_R$ on the axis Y of the mass center of the front wheel 47 and the coordinate $y_P$ on the axis Y of the split point 42 where the pallet 50 and the tower 48 are meeting. The offset value $y_{OFF}$ remains constant for the forklift truck 44.

Since the offset value $y_{OFF}$ is specific to each model of forklift trucks, the offset value $y_{OFF}$ for the forklift trucks 44 can be obtained, using an identifier 51 coupled to the forklift truck 44, for collecting identification information and search for the corresponding offset value $y_{OFF}$ in a database. The offset value $y_{OFF}$ may be measured during a setup phase for each truck of the freight or for each similar model of forklift trucks, and used to populate records of the database. The offset value $y_{OFF}$ can be measured by instruments while the forklift truck 44 doesn't carry the cargo or is holding an object of known size. The identifier 51 is for example an RFID tag, a barcode, or a beacon transmitter. It is also possible to couple the identifier 51 to the pallet 50, as long as the dimensioning system 40 may access to relationship information necessary to identify the forklift truck 44 or at least its model knowing the current pallet being transported through the path 45.

As shown in FIG. 5 corresponding to a side view YZ of the forklift truck 44, as seen by the scanner 41a positioned according to another exemplary spatial configuration SC2, the path 45 followed by the forklift truck may result in that the driving direction N of the path 45 is not perpendicular to the central axis AA' of the scanner 41, but forms, with the central axis AA', an angle O' not sensibly equal to 90° or 180°.

The angle O can be determined in particular from information provided by the scanner 41c in cooperation with the scanner 41b. In spatial configuration wherein the angle O is sensibly different from 90° or 180°, and when the offset value $y_{OFF}$ is used to determine the position of the split point 42, the three-dimensional model data for the truck and cargo is rotated around the z-axis so as that the normal vector N of the path 45 is perpendicular to the central axis AA', before determining the position of the split point 42.

Figure 7:
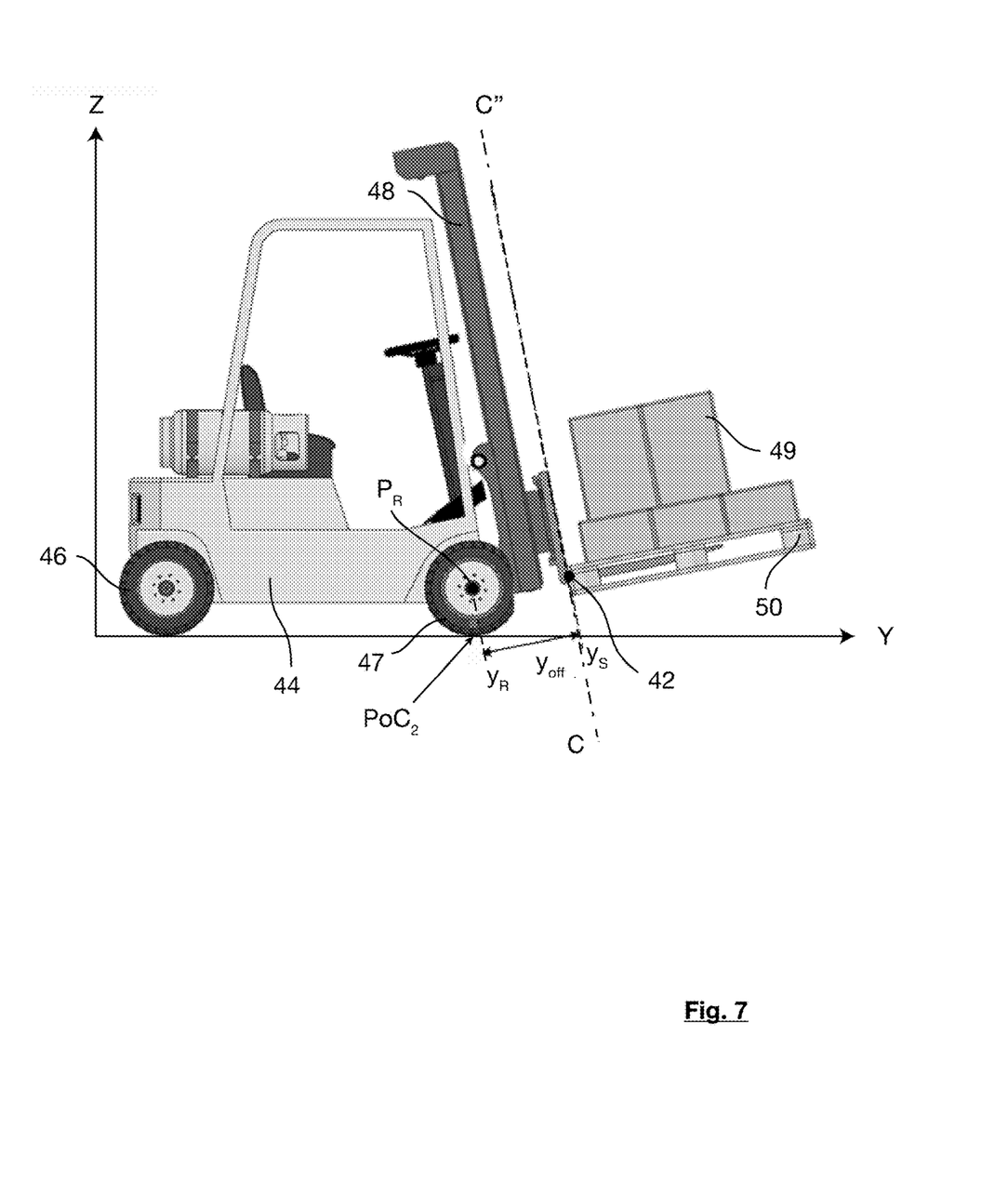
FIG. 7 illustrates, schematically, a forklift truck, from a side view, in a third spatial configuration.
Figure 8:
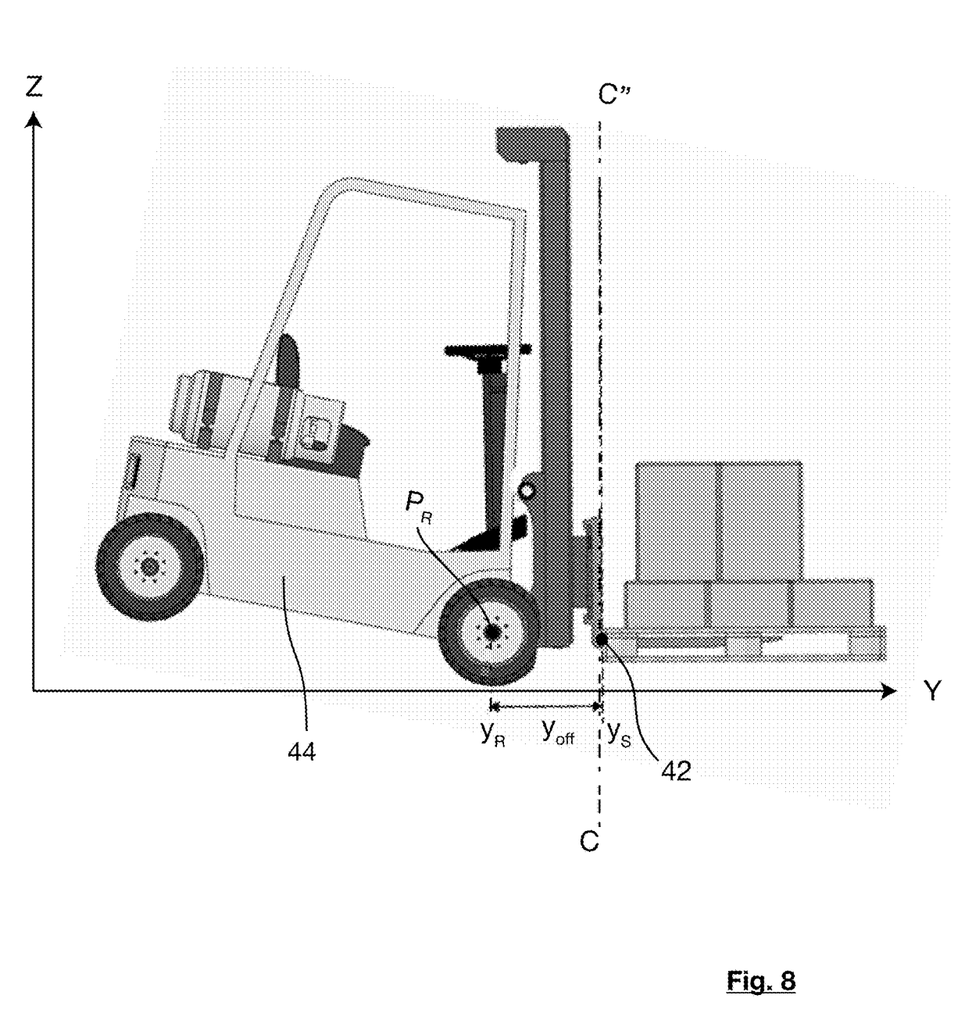
FIG. 8 illustrates, schematically, from a side view, a three-dimensional model of the forklift truck in the third spatial configuration, rotated so as to compensate for the inclination of the pallet relatively to the ground.

As shown in FIG. 7 corresponding to a side view YZ of the forklift truck 44, as seen by the scanner 41a positioned according to another exemplary spatial configuration SC3, the pallet 50 is not held parallel to the ground. When the offset value $y_{OFF}$ is used to determine the position of the split point 42, the three-dimensional model of the truck and cargo is rotated around the perpendicular rotational axis of the front wheel, as illustrated in FIG. 8, so as to compensate for the inclination of the pallet 50 to the ground, before determining the position of the split point 42. The angle of the pallet underside can be obtained using the dimensioning system 40, as described in more detailed in the published patent application EP 3 203 264 A1. As a consequence, the point cloud of the forklift truck 44 in memory is rotated so the pallet 50 is level to the ground and straight forward.

Once the splitting plane CC'C''' passing through the split point 42 and perpendicular to the driving direction N has been determined, a three-dimensional model data of the cargo is determined by subtracting, from the three-dimensional model data of the vehicle 44 transporting the cargo 49, the points, amongst the set of points, positioned on the side of the splitting plane opposite to the side of the splitting plane comprising the point of reference of the wheel. The volume of the cargo model can then be determined, using state-of-art volumetric computation algorithms.

In the example of FIG. 3, the splitting plane CC'C'' is parallel to the tower 48, and perpendicular to the ground, and delineate a region where the forklift truck is from a region where the pallet and the cargo raised by the fork are. The three-dimensional model data of the cargo is determined by subtracting, from the three-dimensional model data of the vehicle 44 transporting the cargo 49, all the geometries positioned on the side of the splitting plane where the center of the front wheel is placed—left side on the figures.

Figure 6:
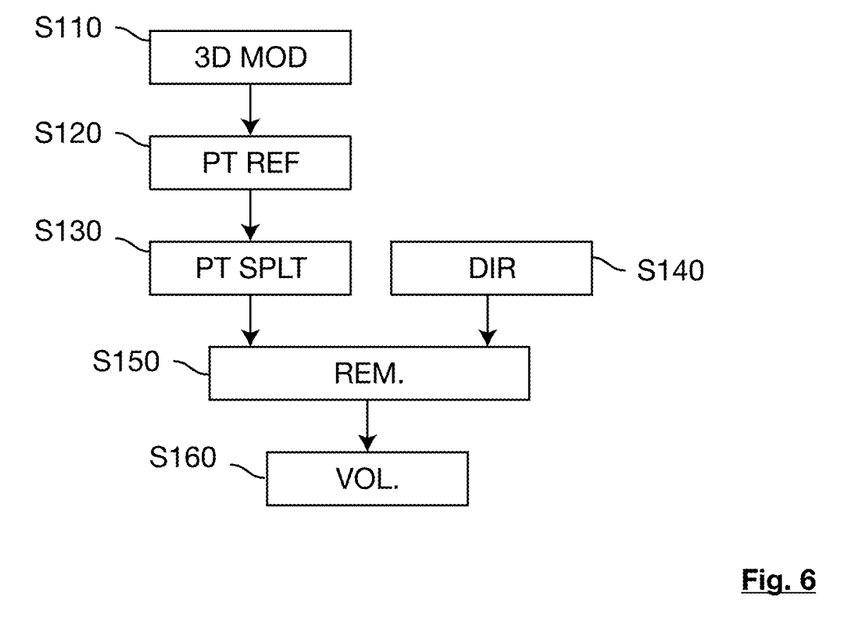
FIG. 6 represents a flowchart of the method according to the invention.

Finally, FIG. 6 delineates the method of the invention in the form of a flowchart. The dimensioning system 40 is adapted to implement the step of the method according to the invention.

The method of dimensioning a cargo while being held at a cargo-handling position of a vehicle, comprises the steps of:

in a step S110, obtaining a three-dimensional model data comprising a set of points representing surfaces of the vehicle transporting the cargo;

in a step S120, determining, using the three-dimensional model data, the position of a point of reference of a wheel of the vehicle;

in a step S130, obtaining the position of a split point relatively to the position of the point of reference of the wheel;

in a step S140, determining a driving direction of the vehicle;

in a step S150, determining the splitting plane passing through the split point and perpendicular to the driving direction, and determining a three-dimensional model data of the cargo by subtracting, from the three-dimensional model data of the vehicle transporting the cargo, the points, amongst the set of points, positioned on the side of the splitting plane opposite to the side of the splitting plane comprising the point of reference of the wheel; and in a step S160, determining the volume of the cargo model.

Although not described in the description in detail it should be clear that the invention is not limited to a method or a system for dynamically dimensioning cargo objects where the cargo object passes the dimensioning system in front of the transporting vehicle but is also applicable in the situation where the cargo object passes the dimensioning system at the back end of the vehicle, e.g. when the vehicle is moving in reverse gear. This invention is also not only limited to fork lifts and can be easyly adapted to other transportation vehicles.

What is claimed is:

1. A method of dynamically dimensioning a cargo of at least one object that is held at a cargo-handling position of a forklift truck with a set of front wheels and a set of rear wheels, the set of front wheels being closer to the cargo-handling position than the set of rear wheels, the method comprising the steps of
    obtaining a set of three-dimensional model data, comprising a set of points, each point representing a part of one of the surface contours of the vehicle and the cargo;
    determining a position of a point of reference of the forklift truck in the three-dimensional model data set;
    determining a driving direction of the forklift truck;
    obtaining a position of a split point relative to of the point of reference, the split point representing a closest distance of the cargo-handling portion to the point of reference in the driving direction;

determining a splitting plane, which is a plane that passes through the split point and is perpendicular to the driving direction;

determining a set of three-dimensional model data of the cargo by removing, from the set of points in the obtained set of three-dimensional model data, the points positioned on the same side of the splitting plane as the point of reference, the remaining points defining the set of three-dimensional model data of the cargo; and determining a volume of the cargo from the three-dimensional model data of the cargo.

2. The method of claim 1, wherein the point of reference is determined by identifying a point of contact of one of the set of front wheels with the ground.

3. The method of claim 1, wherein the point of reference is a mass center or geometric center of one of the set of front wheels.

4. The method of claim 1, wherein each of the set of front wheels is distinguishable from each of the set of rear wheels, in the three-dimensional model data of the forklift truck, by a feature specific to the set of front wheels.

5. The method of claim 4, wherein the feature specific to the set of front wheels relates to a radial dimension of the front wheels.

6. The method of claim 4, wherein the step of determining the driving direction of the forklift truck is achieved by determining a position of the set of front wheels relative to the set of rear wheels.

7. The method of claim 1, wherein the step of obtaining the position of the split point relative to the position of the point of reference is achieved by one the following steps:

obtaining identity information of the forklift truck or of a type associated to the forklift truck; or obtaining, according to the identity information, from a memory, relationship information necessary to determine the position of the split point relative to the position of the point of reference.

8. A dimensioning system for carrying out the method of claim 1, arranged to dimension a cargo while being held at a cargo-handling position of a vehicle, the system comprises:

scanner units arranged to determine a three-dimensional model data comprising a set of points representing surface contours of the vehicle transporting the cargo;

a processing unit configured to:

determine, using the three-dimensional model data, the position of a point of reference of a front wheel of the vehicle;

obtain the position of a split point relatively to the position of the point of reference of the front wheel;

determine a driving direction of the vehicle;

determine the splitting plane passing through the split point and perpendicular to the driving direction, and determining a three-dimensional model data of the cargo by removing, from the three-dimensional model data of the vehicle transporting the cargo, the points, amongst the set of points, positioned on the side of the splitting plane opposite to the side of the splitting plane comprising the point of reference of the front wheel; and determine the volume of the three-dimensional model data of the cargo.

9. Computer program comprising instructions for causing implementation of the method of claim 1, when said program is run by the processor.

10. Support for storing a computer program comprising a set of instructions causing implementation of the method according to claim 1, when the stored information is read from said support and run by a processor.

11. Computer program run by a processing unit configured to dynamically dimensioning a cargo of at least one object that is held at a cargo-handling position of a vehicle, the program comprising instructions for:

determining a point of reference of a front wheel of a vehicle, using a three-dimensional model data provided by scanner units;

determining a driving direction of the vehicle;

obtaining the position of a split point relative to the point of reference of the front wheel, the split point representing a closest distance of the cargo-handling position to the point of reference in the driving direction;

determining a splitting plane of the vehicle, that is, a plane passing through the split point and perpendicular to the driving direction, and determining a three-dimensional model data of the cargo by removing, from the three-dimensional model data of the vehicle transporting the cargo, the points, amongst the set of points, positioned on the side of the splitting plane opposite to the side of the splitting plane comprising the point of reference of the front wheel;

wherein the program is determining the dimensions by processing the three-dimensional model data of the cargo.

12. The system of claim 9, wherein the processing unit comprises:

a processor running a computer program comprising instructions for causing implementation of the method of claim 1.

13. The system of claim 9, wherein the processing unit further comprises:

a support for storing a computer program comprising a set of instructions causing implementation of the method of claim 1.

14. The method of claim 2, wherein the point of reference is either a mass center or a geometric center of the front wheel.

* * * * *

UNITED STATES PATENT AND TRADEMARK OFFICE
CERTIFICATE OF CORRECTION

PATENT NO. : 11,035,662 B2  
APPLICATION NO. : 16/422113  
DATED : June 15, 2021  
INVENTOR(S) : Sorensen Page 1 of 1

It is certified that error appears in the above-identified patent and that said Letters Patent is hereby corrected as shown below:

On the Title Page

Item (30), Foreign Application Priority Data, please delete "May 25, 2018 (EP) ............... 18174220" and insert -- "May 25, 2018 (EP) ............... 18174220.6" --.

In the Claims

In Column 10, Line 64, Claim 1, please delete "to of the" and insert -- to the --.

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*